United States Patent
Ng et al.

(10) Patent No.: US 6,529,585 B2
(45) Date of Patent: Mar. 4, 2003

(54) VOICE LABEL PROCESSING APPARATUS AND METHOD

(75) Inventors: Peter L. Ng, Freehold, NJ (US); Daniel J. Yaniro, Jr., Middletown, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/137,366

(22) Filed: Aug. 20, 1998

(65) Prior Publication Data

US 2002/0071527 A1 Jun. 13, 2002

(51) Int. Cl.[7] .......................... H04M 1/64; G10L 15/06
(52) U.S. Cl. ................ 379/88.03; 379/88.01; 379/355.01; 704/243
(58) Field of Search .......................... 379/88.01, 88.02, 379/88.03, 93.15, 352, 353, 355.01, 355.02, 355.03, 355.04, 355.05–355.09; 704/270.1, 275, 270, 243, 231

(56) References Cited

U.S. PATENT DOCUMENTS

| | | | |
|---|---|---|---|
| 5,165,095 A | * 11/1992 | Borcherding | 379/88.03 |
| 5,325,421 A | 6/1994 | Hou et al. | 379/88.03 |
| 5,353,336 A | 10/1994 | Hou et al. | 379/88.02 |
| 5,812,946 A | * 9/1998 | Nakabayashi et al. | 455/426 |
| 6,018,568 A | * 1/2000 | Furman et al. | 379/93.15 |
| 6,236,715 B1 | * 5/2001 | Wong | 379/88.03 |

* cited by examiner

*Primary Examiner*—Fan Tsang
*Assistant Examiner*—Ovidio Escalante

(57) ABSTRACT

An apparatus and method for processing voice labels and establishing communication connections between a calling party and a called party based on the voice labels. When the calling party wishes to establish a communication with the called party, the calling party activates his/her user device and speaks a voice label into the audio receiver of the user device. The calling party's voice is then converted into analog voice signals (or data voice signals if a data network is being used) and transmitted to a voice label processor. The voice label processor receives the voice signals and extracts at least one feature pattern from the voice signals that identifies the voice label to which it corresponds. The voice label processor then searches a voice label database for the occurrence of the at least one feature pattern and retrieves a predefined voice label code corresponding to the feature pattern from the voice label database and sends a calling party identifier and the retrieved voice label code to a destination identifier determination device. The destination identifier determination device searches a user profile database for an entry corresponding to the calling party identifier. If such an entry is present, the destination identifier determination device searches the entry for the voice label code and retrieves the corresponding destination identifier. The destination identifier determination device then sends the destination identifier to the voice label processor which establishes a communication link to the called party using the retrieved destination identifier.

11 Claims, 6 Drawing Sheets

| 401 | 402 | 403 |
|---|---|---|
| 555-554-4433 | 1 | 703-916-9957 |
|  | 2 | 804-555-1212 |
|  | 3 | 999-918-4732 |
|  | 4 | 703-414-4443 |
|  | 5 | 562-918-4731 |
| 4168 | 1 | 212-888-4398 |

FIG. 4

VOICE LABEL PROCESSING APPARATUS AND METHOD

BACKGROUND OF THE INVENTION

1. Field of Invention

The present invention is directed to an apparatus and method for processing voice labels in a telecommunications network.

2. Description of Related Art

The use of voice labels (e.g., "Call Home", "Call Mom", "Call Office", etc.) to initiate telephone calls is described, for example, in U.S. Pat. Nos. 5,325,421 and 5,353,336, both issued to Hou et al., commonly assigned and hereby incorporated by reference. These devices require that a user's voice pattern for the various voice labels be stored in memory for comparison when the user wishes to use the voice label at a later time. With such a configuration, large amounts of data must be stored and transmitted so that the voice label of a particular user may be recognized and translated into a destination telephone number. Accordingly, there is a need for new technology that translates voice labels into destination telephone numbers more efficiently and requires less storage space and less data to be transmitted.

SUMMARY OF THE INVENTION

The present invention provides an apparatus and method for processing voice labels and establishing a communication connection between a calling party and a called party based on the voice labels. When the calling party wishes to establish a communication with the called party, the calling party activates a user device and speaks a voice label into the audio receiver of the user device. The calling party's voice is then converted into analog voice signals (or data voice signals if a data network is being used) and transmitted to a voice label processor. The voice label processor receives the voice signals and extracts at least one feature pattern from the voice signals that identifies the voice label to which it corresponds. The voice label processor then searches a voice label database for the occurrence of the at least one feature pattern and generates a voice label code by retrieving a predefined voice label code corresponding to the at least one feature pattern from the voice label database and sends a calling party identifier and the retrieved voice label code to a destination identifier determination device.

The destination identifier determination device searches a user profile database for an entry corresponding to the calling party identifier. If such an entry is present, the destination identifier determination device searches the entry for the voice label code and retrieves the corresponding destination device identifier. The destination identifier determination device returns the retrieved destination device identifier to the voice label processor and the voice label processor completes the call to the called party using the retrieved destination device identifier.

BRIEF DESCRIPTION OF THE DRAWINGS

The invention is described in detail with reference to the following figures wherein like numbers designate similar items, and wherein:

FIG. 4 is an exemplary diagram of a data structure of the database of FIG. 1;

DETAILED DESCRIPTION OF PREFERRED EMBODIMENTS

Figure 1:
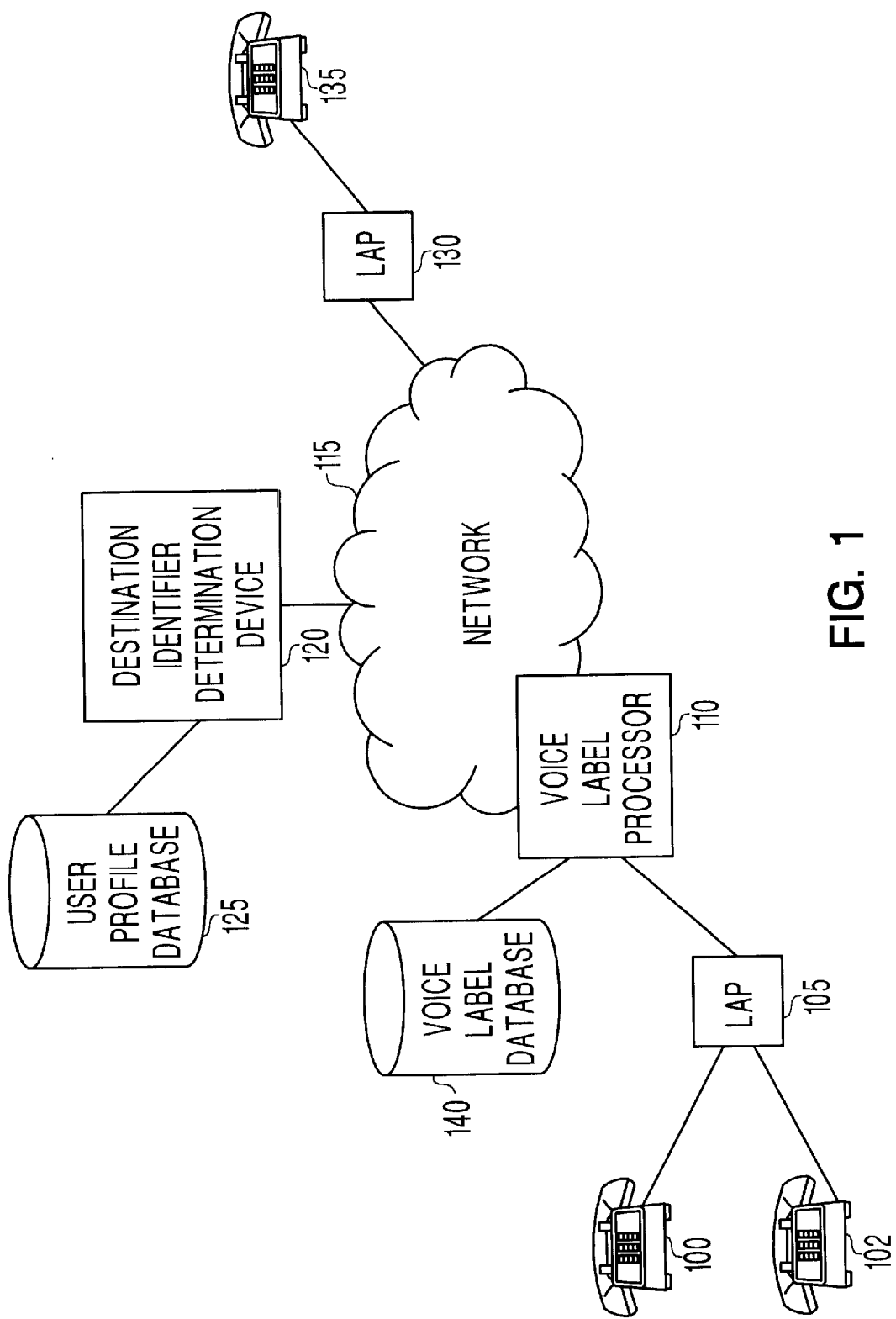
FIG. 1 is a block diagram of a voice label processing system.

FIG. 1 is an exemplary block diagram of voice label processing system according to a preferred embodiment of the present invention. As shown in FIG. 1, the system includes a plurality of user devices 100, 102 and 135, local access providers (LAPs) 105 and 130, network 115, voice label processor 110, voice label database 140, destination identifier determination device 120 and user profile database 125.

The user-devices 100, 102 and 135 may be any type of device that facilitates voice communication. For example, the user devices 100, 102 and 135 may be land-line telephones, cellular telephones, computers equipped with microphones, a voice recognition device and the like. The user devices 100, 102 and 135 include an audio receiver for receiving voice input. The audio receiver may be, for example, a microphone, telephone handset, and the like. The user devices 100, 102 and 135 convert the received voice input into analog voice or voice data signals which are then transmitted to the voice label processor 110. The conversion of the voice input into analog voice or voice data signals is performed in any known manner.

The user devices 100, 102 and 135 are in communication with the network 115 through LAPs 105 and 130 over telecommunications links. These telecommunications links may be any type of connection that allows the transmission of information. Some examples include conventional telephone lines, fiber optic lines, wireless communication links, direct serial connection, and the like.

The network 115 may be any type of telecommunications network or combination of telecommunications networks that facilitate voice communication from a calling party user device 100 to a called party user device 135. For example, the network 115 may be a local Bell Atlantic telephone network in communication with an AT&T long distance telephone network. Similarly, the network 115 may be a data network, such as the Internet, a wide area network (WAN), a local area network (LAN) and the like, or a data network in communication with a telecommunications network.

The network 115 includes at least one voice label processor 110 that receives voice analog and/or voice data signals from a calling party user device 100 and converts them into a voice label code. The voice label processor 110 may be a single processor or may be part of a distributed processing system incorporated into the network 115. The voice label processor 110 has access to at least one voice label database 140 that stores predefined valid voice label feature patterns and corresponding voice label codes.

The network 115 is further in communication with a destination identifier determination device 120 which determines the destination identifiers associated with a particular calling party identifier and voice label code. The destination identifier determination device 120 is further in communication with a user profile database 125 that stores information pertaining to the calling party identifiers, the voice label codes and the corresponding destination identifiers.

When a calling party wishes to establish a communication with a called party, the calling party activates a user device 100, for example, and speaks a voice label into the audio receiver of the user device 100. The calling party's voice input is then converted by the user device 100 into analog voice signals (or data voice signals if a data network is being used) and transmitted, along with a calling party identifier, to the voice label processor 110 via the LAP 105 and corresponding communication links. The voice label processor 110 receives the voice signals and calling party identifier, and extracts at least one feature pattern from the voice signals. The at least one feature pattern is then compared to feature patterns stored in the voice label database 140 to identify the voice label to which it corresponds. The voice label processor 110 then retrieves a predefined voice label code corresponding to the identified voice label from the voice label database 140 and sends the calling party identifier and the voice label code to the destination identifier determination device 120.

The calling party identifier may be, for example, a telephone number, IP address, calling card number, credit card number, personal identification number, social security number, a name and the like. The calling party identifier may be obtained from a header signal to the analog voice or data voice signals that identifies the telephone number, IP address, or the like, of the calling party's user device 100, for example. Alternatively, the calling party may enter the calling party identifier through an interface in the user device 100 before speaking the voice label into the receiver. The interface may be, for example, a telephone keypad, a computer keyboard, a voice recognition device, a graphical user interface, and the like.

The destination identifier determination device 120 retrieves information from the user profile database 125 based on the calling party identifier. The information retrieved may include the valid voice label codes that have been previously registered by that particular calling party and the corresponding destination identifiers. The destination identifier determination device 120 then checks the received voice label code against the valid voice label codes included in the information retrieved from the user profile database 125. If the received voice label code is a valid voice label code for the particular calling party having the calling party identifier (i.e., the received voice label code matches one of the previously registered valid voice label codes for the calling party), a destination identifier associated with the voice label code is obtained which identifies user device 135, for example. The destination device identifier may be, for example, a telephone number, an IP address, a network location identifier and the like. The destination identifier determination device 120 then returns the destination device identifier to the voice label processor 110. The voice label processor 110 then causes the communication connection between the calling party's user device 100 and the user device 135 to be established by issuing routing commands to the network 115 to bridge the calling party's user device 100 and the user device 135. Alternatively, the destination identifier determination device 120 may cause the communication connection to be established between the calling party's user device 100 and the user device 135 if the destination identifier determination device 120 is equipped to received and transmit voice data.

Figure 2:
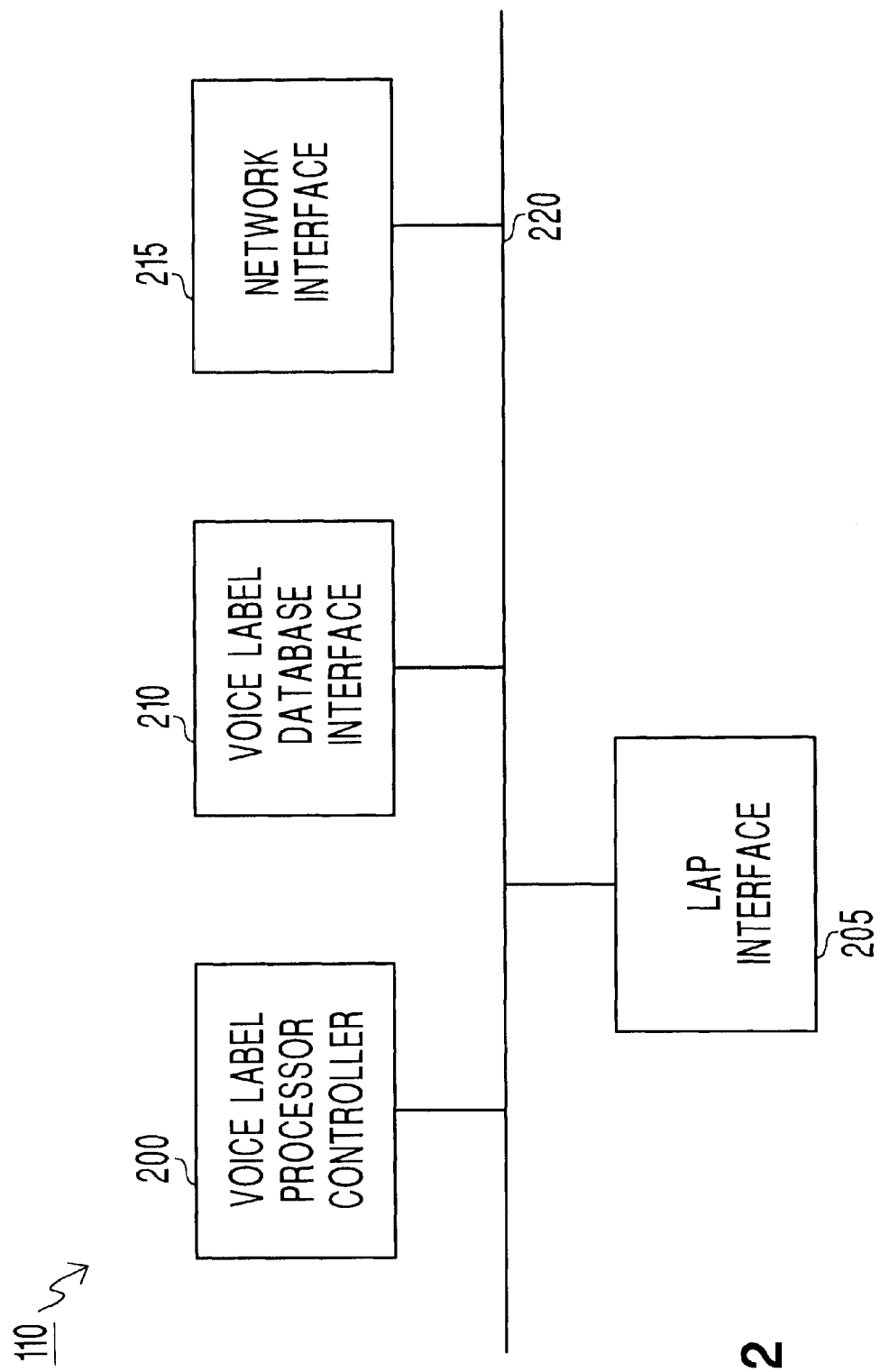
FIG. 2 is a block diagram of the voice label processor of FIG. 1.

FIG. 2 is a block diagram of the voice label processor 110 of FIG. 1. As shown in FIG. 2, the voice label processor 110 includes a voice label processor controller 200, an LAP interface 205, a voice label database interface 210 and a network interface 215. These devices are in communication with one another through bus 220.

When a calling party initiates a communication using voice labels by speaking a voice label into the audio receiver of the user device 100, the voice input is converted into analog voice signals (or data voice signals when using voice telephony or voice recognition and a data network) which are directed to the voice label processor 110 through LAP 105. The voice signals are received at the LAP interface 205 and forwarded to the voice label processor controller 200. The voice label processor controller 200 extracts at least one feature pattern from the voice signals and compares the extracted feature patter(s) with predetermined feature patterns stored in the voice label database 140.

The feature patterns are patterns that identify, for example, the input level of the voice input at predetermined sample times. The feature patterns are used to identify a voice label, i.e. "Call Mom", "Call Home" and the like. The feature patterns are not dependent on the particular voice pattern of the individual speaker and are also not limited to the input level of the voice input at predetermined sample times but may be any type of pattern that may be used to identify voice labels included in a voice signal. Alternatively, conventional voice recognition techniques that are not user specific may be utilized to effect identification of the voice labels in a voice signal.

The extracted feature pattern(s) of the voice signal is compared with feature patterns stored in the voice label database 140 by sequentially retrieving the feature patterns stored in the voice label database 140 through voice label database interface 210 and comparing the extracted feature pattern(s) to the retrieved feature patterns. If the extracted feature pattern is determined to be the same as a stored feature pattern, within a predetermined tolerance, the voice label processor controller 200 determines that the voice label corresponding to the stored feature pattern is the voice label spoken by the calling party.

The feature patterns stored in the voice label database 140 are system specific feature patterns that are utilized to identify a voice label independent of the speaker of the voice label. Thus, the voice label database 140 may include a predetermined system specified list of recognizable feature patterns corresponding to a set of voice label codes. When a calling party speaks a voice label, the feature patterns extracted from the spoken voice label are compared with each feature pattern in the system specified list of recognizable feature patterns until a match is obtained within a predetermined tolerance.

Once the matching feature pattern is determined, the voice label processor controller 200 then determines that the corresponding voice label code, i.e. the location of the stored feature pattern, is the voice label code for the voice label spoken by the calling party. Alternatively, the voice label code may be an entry in the voice label database 140 that is associated with the stored feature pattern. The calling party identifier and the retrieved voice label code are then transmitted to the destination identifier determination device 120 via the network interface 215 and network 115.

If the voice label processor controller 200 is unable to determine a voice label code from the feature patterns, the voice label processor controller 200 may send a request message to the user device 100 asking that the voice label be reentered. After a predetermined number of attempts at identifying a voice label code, the voice label processor controller 200 may then cause a communication connection to be established between the user device 100 and a customer service center so that the operator of the user device 100 may obtain assistance in using the voice label processor 110.

Figure 3:
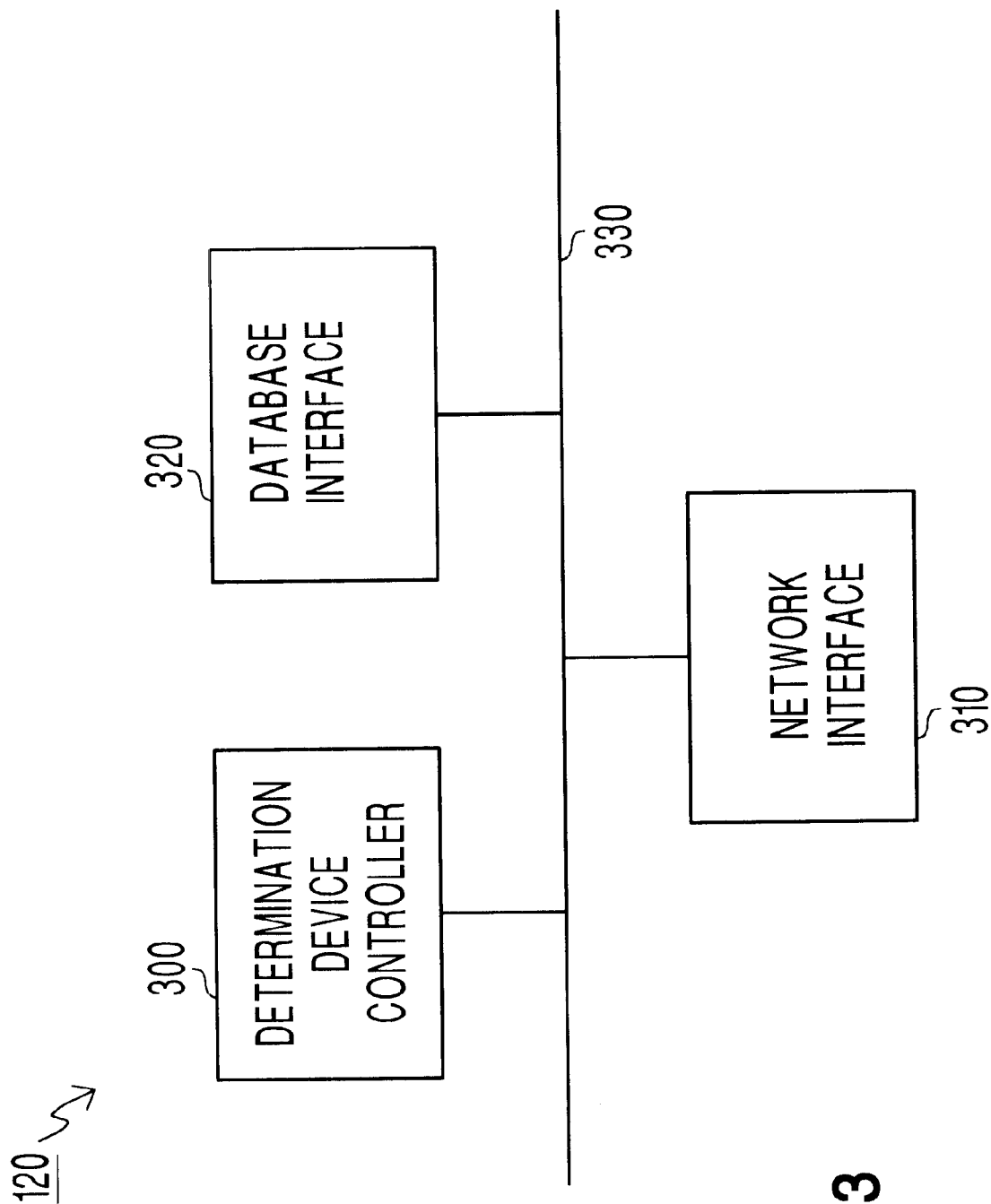
FIG. 3 is a block diagram of the destination identifier determination device of FIG. 1.

FIG. 3 is a block diagram of the destination identifier determination device 120 of FIG. 1. As shown in FIG. 3, the destination identifier determination device 120 includes a determination device controller 300, a network interface 310 and a database interface 320. These devices are in communication with one another over bus 330.

When the calling party identifier and voice label code are transmitted to the destination identifier determination device 120, they are received by the network interface 310 and forwarded to the determination device controller 300. The determination device controller 300 retrieves information corresponding to the calling party identifier from the user profile database 125 through user profile database interface 320. The information retrieved includes information pertaining to the voice label codes used by the calling party having the particular calling party identifier and the destination device identifiers corresponding to the voice label codes.

The determination device controller 300 retrieves a destination identifier that corresponds to the received voice label code from the user profile database 125. The determination device controller 300 then sends the destination identifier via the network interface 310 to the voice label processor 110 which completes the communication by issuing routing commands to the network 115 to bridge the calling and called parties together, thereby establishing a communication link between them.

FIG. 4 is an exemplary diagram of a data structure of the user profile database 125. As shown in FIG. 4, the data structure includes a field 401 for the calling party identifier, a field 402 for the voice label codes that are useable by the calling party having the corresponding calling party identifier, and a field 403 for the destination device identifier corresponding to the voice label codes. Thus, the determination device controller 300 is able to retrieve a destination device identifier by first searching field 401 for the calling party identifier received from the voice label processor 110, searching field 402 for the voice label code received from the voice label processor 110, and then retrieving the corresponding destination device identifier from field 403.

Using the above voice label processing apparatus, large amounts of data need not be stored since the voice labels are identified from the feature patterns extracted from the input voice signals which are then compared with a predetermined set of feature patterns. Further, large amounts of data need not be transmitted since the voice label is translated into a corresponding code and only the code is transmitted over the network 115.

Figure 5:
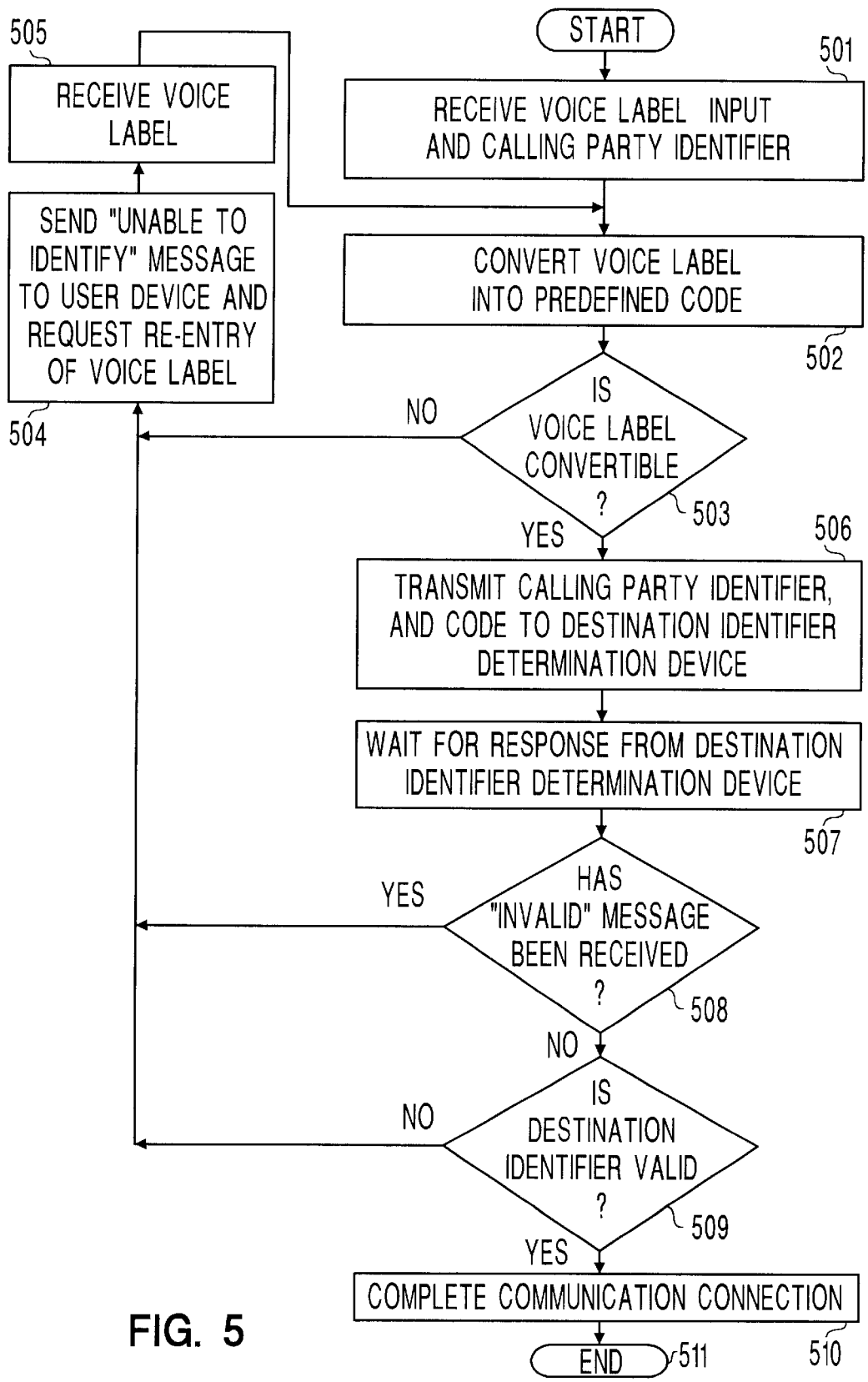
FIG. 5 is a flowchart of the operation of the voice label processor of FIG. 2.

FIG. 5 is a flowchart of the operation of the voice label processor 110 of FIG. 2. In step 501, the voice label processor controller 200 receives a voice label input and calling party identifier from a user device 100, for example, and goes to step 502.

In step 502, the voice label processor controller 200 converts the voice label into a predefined code by extracting at least one feature pattern from the voice label input signals and comparing the extracted feature pattern(s) with predetermined feature patterns stored in the voice label database 140. In step 503, if the voice label is not able to be converted in step 502 because its feature pattern(s) does not correspond to a predetermined feature pattern in the voice label database 140, for example, the voice label processor controller 200 goes to step 504; otherwise the voice label processor controller 200 continues to step 506.

In step 504 the voice label processor controller 200 sends an "unable to identify called party" message and requests reentry of the voice label and goes to step 505. In step 505, the voice label processor controller 200 receives the reentry of the voice label and returns to step 502.

In step 506, the voice label processor controller 200 transmits the calling party identifier and the voice label code to the destination identifier determination device 120 and goes to step 507. In step 507, the voice label processor controller 200 waits for a response from the destination identifier determination device 120 and continues to step 508 when the response is received. The response may be either a destination identifier corresponding to the voice label code or an "invalid" message as described below.

In step 508, the voice label processor controller 200 determines if the destination identifier determination device 120 responded with an "invalid" message. The "invalid" message is received by the voice label processor controller 200 when the destination identifier determination device 120 determines that the voice label code retrieved from the voice label database 140 is not valid for the particular calling party identifier. If an "invalid" message was received, the voice label processor controller 200 goes to step 504; otherwise the voice label processor controller 200 goes to step 509.

In step 509, the voice label processor controller 200 determines if the destination identifier received from the destination identifier determination device 120 is valid. If it is valid, the voice label processor controller 200 continues to step 510; otherwise the voice label processor controller 200 goes to step 504. In step 510, the voice label processor controller 200 causes the communication connection between the user device 100 and the destination user device identified by the destination identifier to be completed. The voice label processor controller 200 continues to step 511 and ends.

Figure 6:
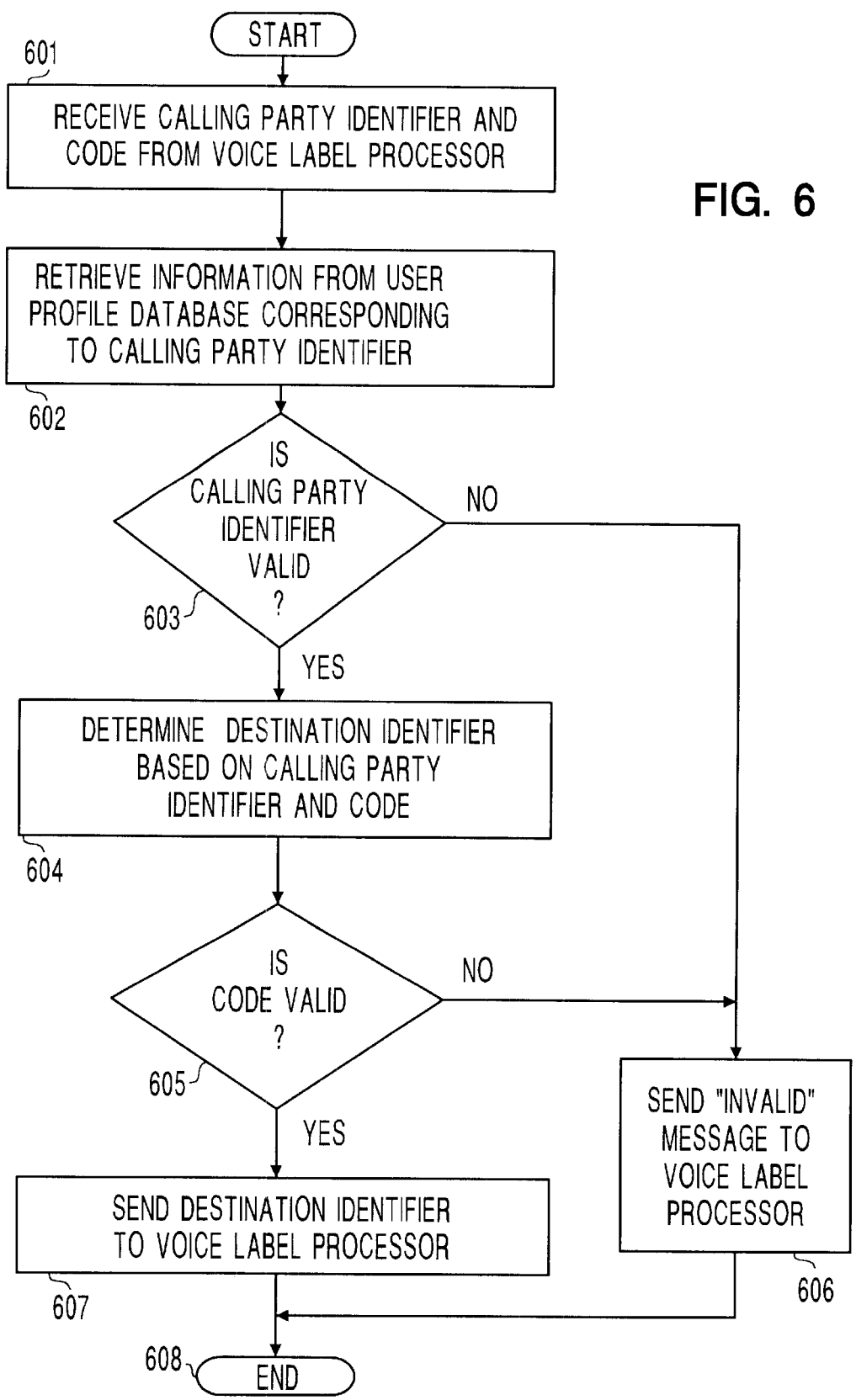
FIG. 6 is a flowchart of the operation of the destination identifier determination device of FIG. 3.

FIG. 6 is a flowchart of the operation of the destination identifier determination device 120. In step 601, the determination device controller 300 receives the calling party identifier and the voice label code from the voice label processor 110 and goes to step 602. In step 602, the determination device controller 300 searches the user profile database 125 for the calling party identifier, retrieves the information corresponding to the calling party identifier if the calling party identifier is present in the user profile database 125, and goes to step 603.

In step 603, if the calling party identifier is not present in the user profile database 125, the determination device controller 300 goes to step 606; otherwise the determination device controller 300 continues to step 604. In step 606, the determination device controller 300 sends an "invalid" message to the voice label processor 110, indicating that the voice label/calling party identifier entered by the calling party is invalid, and goes to step 608 and ends.

In step 604, the determination device controller 300 determines the destination identifier corresponding to the calling party identifier and the voice label code received from the voice label processor 110, and goes to step 605. In step 605, if the voice label code does not correspond to a voice label code of the calling party having the calling party identifier, the determination device controller 300 goes to step 606; otherwise the determination device controller 300 continues to step 607. In step 607, the determination device controller 300 sends the destination identifier to the voice label processor 110 and ends at step 608.

As a practical example of the above voice label processing apparatus and method, consider a calling party wishing to place a call to his mother using a voice label. When the calling party initiates the call, he may enter a calling party identifier, such as his calling card number, credit card number, personal identification number, social security number and the like. Alternatively, the calling party identifier may be the telephone number of the user device 100 that the calling party is using and may be automatically determined from a header signal.

The calling party may then speak a voice label, such as "Call Mom", into the audio receiver of the user device 100. The voice signals are then transmitted to the voice label processor 110 where at least one feature pattern is extracted from the voice signals. The feature pattern(s) is then compared against predetermined feature patterns that are stored in a voice label database 140. The predetermined feature patterns represent predetermined voice labels that are recognizable by the voice label processor 110. For example, the voice label processor 110 may be able to recognize the voice labels "Call Mom", "Call Home", "Call Work", and "Call Doctor." The recognizable voice labels are not user dependent and are general to all users of the voice label processor 110.

If the feature pattern of the calling party's voice label corresponds to a predetermined feature pattern, the voice label processor 110 obtains the corresponding voice label code, for example "1". The voice label processor 110 then transmits the calling party identifier and the voice label code to the destination identifier determination device 120.

The destination identifier determination device 120 receives the calling party identifier and the voice label code corresponding to the voice label "Call Mom" and searches the user profile database 125 for the calling party identifier. Once the calling party identifier is found in the user profile database 125, the voice label code "1" is found and the corresponding destination identifier is retrieved. The call is then completed to "Mom" by establishing a communication connection with the destination identifier in the conventional manner.

While the above embodiment of the present invention assumes, for purposes of explanation, that the voice label processor 110, destination identifier determination device 120, voice label database 140 and user profile database 125 are separate devices, these devices may be incorporated into a single device. Similarly, these devices may be distributed within the network 115.

As shown in FIGS. 2 and 3, the method of this invention is preferably implemented on a programmed processor or programmed processors. However, the voice label processor 110 and the destination identifier determination device 120 can also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which a finite state machine capable of implementing the flowcharts shown in FIGS. 5 and 6 can be used to implement the security processor functions of this invention.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. A method of establishing a communication connection between a source device and a destination device, comprising:

receiving a voice label input signal from the source device;

converting the voice label input signal into a voice label code; wherein the converting of the voice label input signal comprises:

extracting at least one feature pattern from the voice label input signal; and generating the voice label code, the generated voice label code being a voice label code that corresponds to a predetermined feature pattern that matches the extracted feature pattern, wherein the step of generating a voice label code includes comparing the at least one extracted feature pattern with predetermined feature patterns, and retrieving the voice label code directly from a voice label database based on the comparison of the at least one extracted feature pattern to the predetermined feature patterns, and wherein the predetermined feature patterns and voice label codes corresponding to the predetermined feature patterns are stored in the voice label database;

converting the voice label code into a destination identifier; and establishing the communication connection between the source device and the destination device based on the destination identifier.

2. The method of claim 1, wherein the step of generating a voice label code includes determining if the at least one extracted feature pattern matches a predetermined feature pattern within a predetermined tolerance.

3. The method of claim 1, wherein the step of converting the voice label code into a destination identifier includes retrieving the destination identifier from a user profile database based on the voice label code.

4. The method of claim 3, further comprising receiving a calling party identifier from said source device and wherein said step of retrieving the destination identifier includes:

searching the user profile database for an entry corresponding to the calling party identifier received; and searching the entry for the voice label code, wherein the destination identifier retrieved is the destination identifier that corresponds to the voice label code in the entry corresponding to the calling,party identifier.

5. The method of claim 4, wherein the calling party identifier includes at least one of a telephone number, a calling card number, a credit card number, a social security number, a personal identification number and a name.

6. The method of claim 1, wherein the source device and the destination device are in communication with at least one network and wherein the step of establishing a communication connection includes issuing routing commands to the at least one network instructing the at least one network to establish a communication path between the source device and the destination device.

7. An apparatus for establishing a communication connection between at least two communication devices, comprising:

a voice label processor;

a destination identifier determination device, wherein the voice label processor receives a voice label input signal from a source communication device and determines a voice label code based on the voice label input signal, the destination identifier determination device determines a destination identifier based on the voice label code retrieved, and wherein the voice label processor establishes the communication connection between the source communication device and a destination communication device based on the destination identifier; and a voice label database, wherein the voice label processor extracts at least one feature pattern from the voice label input signal and compares the at least one extracted feature pattern with predetermined feature patterns stored with a corresponding voice label code in the voice label database, and wherein the voice label processor directly retrieves a voice label code corresponding to a predetermined feature pattern that matches the extracted feature pattern within a predetermined tolerance.

8. The apparatus of claim 7, further comprising a user profile database, wherein the voice label processor receives a calling party identifier from the source communication device, and wherein the destination identifier determination device determines the destination identifier by:

searching the user profile database for an entry corresponding to the calling party identifier received; and searching the entry for the voice label code, wherein the destination identifier is the destination identifier that corresponds to the voice label code in the entry corresponding to the calling party identifier.

9. The apparatus of claim 8, wherein the calling party identifier includes at least one of a telephone number, a calling card number, a credit card number, a social security number, a personal identification number and a name.

10. The apparatus of claim 7, wherein the source communication device and destination communication device are in communication with at least one network, and wherein the voice label processor establishes the communication connection between the source communication device and a destination communication device by issuing routing commands to the at least one network instructing the at least one network to establish a communication path between the source communication device and the destination communication device.

11. The apparatus of claim 7, wherein the voice label processor and the destination identifier determination device are located remote from one another.

* * * * *